United States Patent [19]

Sugimoto et al.

[11] Patent Number: 5,552,216

[45] Date of Patent: Sep. 3, 1996

[54] ELECTRICALLY CONDUCTIVE COMPOSITION

[75] Inventors: Toshiya Sugimoto; Minoru Suezaki; Tokushige Shitiri; Kouji Maruyama, all of Osaka, Japan

[73] Assignee: Sekisui Chemical Co., Ltd., Osaka, Japan

[21] Appl. No.: 132,315

[22] Filed: Oct. 6, 1993

[30]  Foreign Application Priority Data

| Oct. 7, 1992 | [JP] | Japan | 4-268509 |
| Feb. 18, 1993 | [JP] | Japan | 5-028866 |
| Mar. 12, 1993 | [JP] | Japan | 5-051991 |

[51] Int. Cl.$^6$ .............. B32B 5/16; B32B 27/30; H01B 1/20

[52] U.S. Cl. .......... 428/328; 252/500; 428/522

[58] Field of Search .................. 428/500, 328, 428/522; 252/500

[56]  References Cited

U.S. PATENT DOCUMENTS

| 4,010,117 | 3/1977 | Maruhashi et al. | 252/500 |
| 4,978,473 | 12/1990 | Kuroda et al. | 252/500 |
| 4,983,322 | 1/1991 | Elsenbaumer . | |
| 5,069,820 | 12/1991 | Jen et al. | 252/500 |
| 5,176,962 | 1/1993 | Leyrer et al. | 428/500 |
| 5,213,887 | 5/1993 | Huffman | 428/500 |
| 5,281,363 | 1/1994 | Shacklette et al. | 252/500 |
| 5,324,583 | 6/1994 | Ozaki | 428/500 |
| 5,378,403 | 1/1995 | Shacklette | 252/500 |
| 5,422,423 | 6/1995 | Shacklette et al. | 252/500 |

FOREIGN PATENT DOCUMENTS

| 141939 | 6/1989 | Japan | 252/500 |
| 137121 | 6/1991 | Japan . | |
| WO89/01694 | 2/1989 | WIPO . | |
| WO90/10297 | 9/1990 | WIPO . | |

OTHER PUBLICATIONS

Database WPI, Section Ch, Derwent Publications Ltd., London, GB; Class A85, AN 91–213171 & JP–A–3 137 121 (Showa Denko) 11 Jun. 1991.

Patent Abstracts Of Japan, vol. 9, No. 192 (C–296) 8 Aug. 1985 & JP–A–60 060 166 (Sekisui) 6 Apr. 1985.

*Primary Examiner*—Wayne Langel
*Attorney, Agent, or Firm*—Nikaido, Marmelstein, Murray & Oram LLP

[57]  ABSTRACT

An electrically conductive composition of the invention comprises 100 parts by weight of a (meth)acrylate compound possessing at least two (meth)acryloyl groups, 1 to 100 parts by weight of an anilinic electrically conductive polymer, and 0.1 to 20 parts by weight of a photopolymerization initiator sensitized by active rays. This electrically conductive composition may also comprise an unsaturated compound possessing any one group selected from the group consisting of a phosphoric acid group, a sulfonic acid group and a carboxyl group. Between the surface of a form to be coated and the coating layer made of the electrically conductive composition formed thereon, an inorganic electrically conductive layer composed of the tin oxide powder containing antimony with mean particle size of 0.01 to 0.4 μm, or the barium sulfate powder coated with tin oxide containing antimony with mean particle size of 0.01 to 2 μm, and a synthetic resin may be provided.

6 Claims, No Drawings

ELECTRICALLY CONDUCTIVE COMPOSITION

BACKGROUND OF THE INVENTION

1. Field of the Invention

This invention relates to electrically conductive compositions which are cured by active rays of light such as ultraviolet rays and visible rays, and more particularly to electrically conductive compositions containing electrically conductive polyanilines.

Electrically conductive polymers are being practically applied as electronic devices making use of the property as semiconductor, electrochromic materials utilizing the changes of absorption wavelength at the time of oxidation or reduction, battery electrode materials, electrochemical action substances, electrically conductive fillers for antistatic and electromagnetic wave shielding materials, etc.

In particular, electrically conductive polymers such as polythiophene, polypyrrole, and polyaniline are stable in the air, and those with the electrical conductivity of 100 S/cm or more are electrically conductive polymers suited to practical use.

2. Description of the Prior Art

These electrically conductive polymers are treated by doping for forming a complex of a dopant and an electrically conductive polymer in order to provide them with a metallic electrical conductivity. As this treatment, in such electrically conductive polymers as polypyrrole and polythiophene, it is relatively easy to dope by using iodine or arsenic pentafluoride as the dopant.

In this method, however, as the dopant is released from the electrically conductive polymer with the lapse of time, and the electrical conductivity is lowered. Besides, polypyrrole or polythiophene darkened in color, and transparent electrically conductive layer is not obtained.

Other methods of providing the electrically conductive polymers with metallic electrical conductivity include a method of doping with anions by an electrochemical technique. In this method, although the electrical conductivity is relatively stable, the treating process is complicated, and it is not suited to mass production.

Known polyaniline electrically conductive materials include the following.

The U.S. Pat. No. 4,983,322 discloses an electrically conductive material comprising polyaniline with a molecular weight of 15,000 or more obtained by polymerization of aniline or its derivatives, an inorganic oxidizing dopant for forming a complex therewith, and a solvent.

The WO 89/01694 discloses a thermally stable, electrically conductive, doped polyaniline comprising an ionized polyaniline obtained by polymerization of aniline or its derivatives, and a dispersant organic dopant possessing $SO_3^-$ anion.

The WO 90/10297 also discloses a thermally stable, electrically conductive, doped polyaniline comprising an ionized polyaniline obtained by polymerization of aniline or its derivatives and an organic dopant possessing an anion such as $PO_3^-$, $PO_2^-$, $PO_3H^-$, $SO_2^-$, $SO_3^-$, and $COO^-$.

Electrically conductive materials including polyanilines show a stable electrical conductivity by the use of inorganic or organic protic acid as dopant, but since this polymer is insoluble in solvents, and processability is inferior when manufacturing a paint.

On the other hand, as the electrically conductive material for providing the synthetic resins and others with electrical conductivity, for example, carbon powder or metal powder, carbon fiber or metal fiber, and others are widely used.

The synthetic resin form is provided with electrical conductivity by dispersing these electrically conductive materials in binder to prepare a coating material, and applying the coating material on a form, or kneading and forming the electrically conductive material in synthetic resin.

The synthetic resin form thus provided with electrical conductivity is used in containers of semiconductor wafer electronic and electric materials, floor and wall materials of semiconductor manufacturing shop, and others that require antistatic performance.

The formed body using such electrically conductive material is generally opaque, and the content cannot be seen through from outside.

To obtain a transparent paint, for example, the Japanese Laid-open Patent Sho. 57-85866 discloses a paint having electrically conductive fine powder mainly composed of tin oxide contained in the binder. This paint forms a transparent and antistatic coat film, but since the binder is a thermoplastic resin, the obtained coat film is generally low in hardness, and insufficient in resistance to solvent.

The Japanese Laid-open Patent Sho. 60-60166 proposes a paint which is cured by ultraviolet ray or visible ray in order to improve the hardness and resistance to solvent.

This paint is excellent in electrical conductivity and transparency, but since fine powder of tin oxide is contained, the hardness and abrasion resistance of the coat film are not enough, and moreover it takes a long time in dispersing the fine powder in the binder, and even after dispersing, because of aggregation, the storage life of the paint is poor.

SUMMARY OF THE INVENTION

It is hence a primary object of the invention to present an electrically conductive composition capable of forming a coat film excellent in hardness, alkali resistance, electrical conductivity, and transparent, being easily cured by ultraviolet ray, visible ray or the like.

The invention presents an electrically conductive composition comprising (A) 100 parts by weight of a (meth)acrylate compound possessing at least two (meth)acryloyl groups, (B) 1 to 100 parts by weight of an anilinic electrically conductive polymer, and (C) 0.1 to 20 parts by weight of a photopolymerization initiator intensified by active rays of light.

The anilinic electrically conductive polymer is preferably a salt of anilinic polymer and a dopant.

The dopant may be an acid. The dopant may be also an unsaturated compound possessing at least one group selected from the group consisting of a phosphoric acid group, a sulfonic acid group and a carboxyl group.

The electrically conductive composition may further comprise an unsaturated compound possessing at least one group selected from the group consisting of a phosphoric acid group, a sulfonic acid group and a carboxyl group. By the addition of such unsaturated compound, the formed coating layer becomes excellent in transparency and electrical conductivity.

When the electrically conductive composition is applied on the surface of a form to form a coating layer, an antistatic form is produced.

The form may be, for example, a film, a sheet or a cabinet.

Between the surface of the form and the coating layer composed of the electrically conductive composition formed thereon, there may be provided an inorganic electrically conductive layer made of tin oxide powder containing antimony with mean particle size of 0.01 to 0.4 µm or barium sulfate powder coated with tin oxide containing antimony with mean particle size of 0.01 to 2 µm and a synthetic resin. The antistatic form possessing such inorganic conductive layer possesses electrical conductivity and is also excellent in transparency and abrasion resistance. Besides, inorganic conductive material is not present in the surface conductive coating layer, release of impurity, especially metal, does not occur, so that it may be preferably used as the antistatic material of semiconductor related parts and others.

DETAILED DESCRIPTION OF THE INVENTION

The electrically conductive composition of the invention comprises (A) 100 parts by weight of a (meth)acrylate compound possessing at least two (meth)acryloyl groups, (B) 5 to 100 parts by weight of an anilinic electrically conductive polymer, and (C) 0.1 to 10 parts by weight of a photopolymerization initiator intensified by active rays of light.

a) The (meth)acrylate compound (A) used in the invention contains at least two acryloyl groups or methacryloyl groups, and its examples include, among others, ethylene glycol di(meth)acrylate, diethylene glycol di(meth)acrylate, triethylene glycol di(meth)acrylate, tetraethylene glycol di(meth)acrylate, polyethylene glycol di(meth)acrylate, tripropylene glycol di(meth)acrylate, tetrapropylene glycol di(meth)acrylate, nonapropylene glycol di(meth)acrylate, polypropylene glycol di(meth)acrylate, pentaerythritol tri-(meth)acrylate, dipentaerythritol penta(meth)acrylate, dipentaerythritol hexa(meth)acrylate, trimethylol propane tri(meth)acrylate, glycerol tri(meth)acrylate, tris-(2-hydroxyethyl)-isocyanuric ester(meth)acrylate, 2,2-(hydroxyethyl)-isocyanuric ester(meth)acrylate, 2,2-bis[4-(meth)acryloxy diethoxy) phenyl]propane, 3-phenoxy-2-propanoyl acrylate, and 1,6-bis(3-acryloxy-2-hydroxy propyl)-hexyl ether.

Besides, an acrylic urethane oligomer possessing urethane bond may be preferably used because it is excellent in hardness and the abrasion resistance of the coating layer.

Such urethane oligomer is prepared by polymerizing polyol and a compound possessing at least two isocyanate groups, and causing acrylates or methacrylates possessing active hydrogen to react with the isocyanate groups at the molecule ends.

Examples of polyol include, among others, ethylene glycol, 1,2-propane diol, 1,3-propane diol, neopentyl glycol, 1,3-butane diol, 1,4-butane diol, 2,3-butane diol, 1,5-heptane diol, 1,5-hexane diol, diethylene glycol, dipropylene glycol, triethylene glycol, tetraethylene glycol, and polyethylene glycol.

Other polyols include polyester glycol, ε-caprolactone open ring polymer, and others which are condensation reaction products of adipic acid and propane diol, adipic acid and neopentyl glycol, adipic acid and butane diol, etc.

Compounds containing at least two isocyanates in a molecule include, for example, m-phenylene diisocyanate, p-phenylene diisocyanate, toluene-2,4-diisocyanate, toluene-2,5-diisocyanate, toluene-3,5-diisocyanate, m-xylene diisocyanate, p-xylene diisocyanate, hexamethylene diisocyanate, trimethyl hexamethylene diisocyanate, isophorone diisocyanate, 4,4'-diphenyl methane diisocyanate, 4,4'-diisocyanate-3,3'-dimethyl biphenyl, and 4,4'-diisocyanate-3,3'-dimethyl biphenyl methane.

Examples of acrylate or methacrylate possessing active hydrogen include, among others, 2-hydroxy ethyl-(meth)acrylate and 3-hydroxy propyl (meth)acrylate.

The (meth)acrylate compound possessing at least two (meth)acryloyl groups may be used either alone or in combination of two or more compounds.

b) In the electrically conductive composition of the invention, the content of the anilinic electrically conductive polymer (B) is 1 to 100 parts by weight, or preferably 5 to 80 parts by weight, to 100 parts by weight of the (meth)acrylate compound (A) because the electric conductivity is lowered if too less, or the hardness, alkali resistance and transparency of the obtained coating layer are lowered if too much.

The anilinic electrically conductive polymer is, preferably, a salt of anilinic polymer and a dopant.

The dopant may be an acid. Preferred examples of the acid include inorganic acids such as phosphoric acid, hydrochloric acid, sulfuric acid, and nitric acid, and organic acids such as p-toluene sulfonic acid, dodecane sulfonic acid, and dodecyl benzene sulfonic acid.

The dopant may be also an unsaturated compound possessing at least one group selected from the group consisting of a phosphoric acid group, a sulfonic acid group, and a carboxyl group.

(i) The anilinic electrically conductive polymer composed of a salt of anilinic polymer and unsaturated compound possessing a phosphoric acid group contains, for example, the constituent unit expressed in formula (1) below.

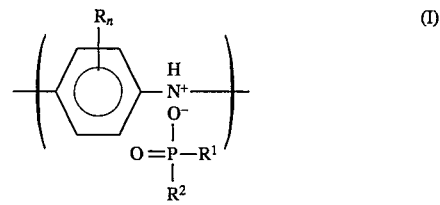

Wherein R is a hydrogen atom, an alkyl group, an alkoxy group or a phenyl group with i to 15 carbon atoms, n is 1 or 2, $R^1$ is a group expressed in formula (II) or (III), and $R^2$ is ether a hydroxyl group or a group expressed in formula (II) or (III), and $R^1$ and $R^2$ may be either same or different.

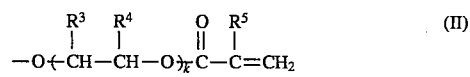

Wherein $R^3$, $R^4$ and $R^5$ may be either same or different, a hydrogen atom, a methyl group, or a methyl halide group, and k is 0 or any integer from 1 to 8.

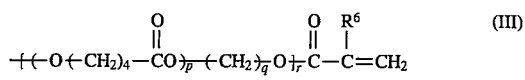

Wherein $R^6$ is a hydrogen atom, a methyl group or a methyl halide group, and each of p, q and r is either 0 or any integer from 1 to 8.

Examples of methyl halide group include chloromethyl and bromomethyl, among others.

The anilinic polymer may comprise, aside from the constituent unit expressed in formula (I), other constituent unit shown in formula (IV) or (V).

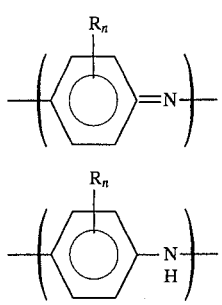

(IV)

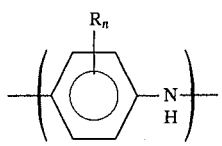

(V)

R and n are same as defined above in formula (IV) and (V).

The content of the constituent unit corresponding to formula (I) contained in the anilinic electrically conductive polymer used in the invention is preferably 10 to 90% of the total constituent units because the electrical conductivity is lowered if too less or if too much.

As a method of preparing the anilinic electrically conductive polymer, for example, an anilinic monomer and an ester phosphate [$(R^1)(R^2)P(=O)OH$, $R^1$ and $R^2$ are same as above] are dissolved in a solvent such as water and dimethyl formamide, and an oxidizer solution is dropped in this solution and agitated to oxidize and polymerize.

The content of the ester phosphate is preferably 0.1 to 0.9 mol for 1 mol of the anilinic monomer because the reaction rate slows down, the doping is insufficient, and the electrical conductivity is lowered if too less, or the excess portion of the ester phosphate lowers the electric conductivity if too much.

Examples of ester phosphate include, among others, acid phosphoxy polyethylene glycol mono(meth)acrylate, acid phosphoxy ethyl (meth)acrylate, 3-chloro-2-acid phosphoxy propyl (meth)acrylate, acid phosphoxy propyl (meth)acrylate, acid phosphoxy polyoxy ethylene glycol mono(meth)acrylate, and acid phosphoxy polyoxy propylene glycol mono(meth)acrylate.

The polymerization reaction tends to be lower in the electrical conductivity of the polymer at higher temperature, and it is therefore preferred to polymerize at temperature of 5° to 30° C. in a reaction time of 1 to 5 hours, and it is desired to react in water bath or ice bath in order to maintain this temperature.

In other method of preparing the anilinic electrically conductive polymer, for example, an inorganic protic acid such as hydrochloric acid, sulfuric acid and nitric acid and an anilinic monomer are polymerized with an oxidizing agent, and this polymer is wash in an alkali such as ammonia and sodium hydroxide to remove acid, and an undoped anilinic polymer in the constituent unit of formula (IV) or (V) is prepared, and then an ester phosphate [$(R^1)(R^2)P(=O)OH$, $R^1$ and $R^2$ are same as above] is added. In this case, the content of the ester phosphate is preferred to be 0.1 to 0.9 mol per 1 mol of the anilinic monomer by the same reason as above.

Examples of anilinic monomer, that is, substituted or unsubstituted aniline, include aniline, o-toluidine, m-toluidine, 2-ethyl aniline, 3-ethyl aniline, 2,4-dimethyl aniline, 2,5-dimethyl aniline, 2,6-dimethyl aniline, 2,6-diethyl aniline, 2-methoxy aniline, 4-methoxy aniline, 2,4-dimethoxy aniline, and 2-aminobiphenyl.

Examples of the oxidizing agent include, among others, persulfate, hydrogen peroxide, permanganate, lead dioxide, dichromate, and manganese dioxide.

(ii) The anilinic electrically conductive polymer composed of a salt of anilinic polymer and unsaturated compound possessing sulfone group contains, for example, a constituent unit expressed in formula (VI) preferably by 10 to 90% of the total constituent units.

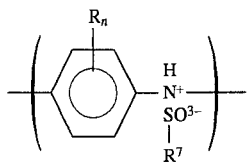

(VI)

Wherein R and n are same as defined above, and $R^7$ indicates a group having a vinyl group within the structure.

Such $R^7$ may include the following examples.

—$R^8$—CH=CH$_2$

—C$_6$H$_4$—$R^8$—CH=CH$_2$

—$R^8$—OCO—CH=CH$_2$

—$R^8$—NHCO—CH=CH$_2$

Wherein $R^8$ represents —(CH$_2$)$_s$—, —(CH$_2$O)$_s$—, —(CH$_2$CH$_2$O)$_s$—, —C(CH$_3$)$_2$—, —C(CH$_3$)$_2$CH$_2$—, and s is 0 or any integer from 1 to 15.

The content of the constituent unit corresponding to formula (VI) contained in the anilinic electrically conductive polymer used in the invention is preferably 10 to 90% of the total constituent units because the electrical conductivity is lowered if too less or if too much.

The anilinic electrically conductive polymer may contain, aside from the constituent unit expressed in formula (VI), the constituent unit expressed in formula (IV) or (V).

As a method of preparing the anilinic electrically conductive polymer, for example, an anilinic monomer, and sulfonic acid ($R^7SO_2OH$, $R^7$ is same as defined above) or its salt are dissolved in a solvent such as water and dimethyl formamide, and an oxidizing agent solution is dropped in this solution to agitate, thereby oxidizing and polymerizing.

If the content of the sulfonic acid or its salt is insufficient, the reaction rate becomes slow, the doping is not enough, and the electrical conductivity is lowered. If excessive, the excess portion of the sulfonic acid or its salt lowers the electrical conductivity, and hence it is desired to be 0.1 to 0.9 mol per 1 mol of the anilinic monomer.

Examples of sulfonic acid include 2-acrylamido-2-methyl propane sulfonic acid, p-styrene sulfonic acid, etc.

The polymerization reaction tends to be lower in the electrical conductivity of the polymer at higher temperature, and it is therefore preferred to polymerize at temperature of 5 to 30° C. in a reaction time of 1 to 5 hours, and it is desired to react in water bath or ice bath in order to maintain this temperature.

In other method of preparing the anilinic electrically conductive polymer, for example, an inorganic protic acid such as hydrochloric acid, sulfuric acid and nitric acid and an anilinic monomer are polymerized with an oxidizing agent, and this polymer is washed in an alkali aqueous solution such as ammonia and sodium hydroxide aqueous solution to remove acid, and an undoped anilinic polymer in the constituent unit of formula (IV) or (V) is prepared, and then sulfonic acid ($R^7SO_2OH$, $R^7$ is same as defined above) or its salt is added. In this case, the content of the sulfonic acid or its salt is preferred to be 0.1 to 0.9 mol per 1 mol of the anilinic monomer by the same reason as above.

Examples of the anilinic monomer and oxidizing agent are same as listed in (ii).

(iii) The anilinic electrically conductive polymer composed of a salt of anilinic polymer and unsaturated compound possessing carboxyl group is obtained, for example, by dissolving an anilinic monomer and (meth)acrylic acid in a solvent such as water and dimethyl formamide, and dropping an oxidizing agent solution in the solution to agitate, thereby oxidizing and polymerizing.

c) The photopolymerization initiator (C) used in the invention is activated by active rays of light such as ultraviolet ray and visible ray.

Examples of the photopolymerization initiator activated by ultraviolet ray include, among others, sulfides such as sodium methyl dithiol carbamate sulfide, diphenyl monosulfide, dibenzothiazoyl monosulfide, and dibenzothiazoyl disulfide; thioxanthone derivatives such as thioxanthone, 2-ethylthioxanthone, 2-chlorothioxanthone, and 2,4-diethylthioxanthone; (di)azo compounds such as hydrazone, azobisisobutyronitrile, and benzene diazonium; aromatic carbonyl compounds such as benzoin, benzoin methyl ether, benzoin ethyl ether, benzophenone, dimethyl aminobenzophenone, Michler's ketone, benzyl anthraquinone, t-butyl anthraquinone, 2-methyl anthraquinone, 2-ethyl anthraquinone, 2-amino anthraquinone, 2-chloro anthraquinone, benzyl dimethyl ketal, and methyl phenyl glioxylate; dialkyl aminobenzoic acid esters such as methyl p-dimethyl aminobenzoate, ethyl p-dimethyl aminobenzoate, butyl p-dimethyl aminobenzoate, and isopropyl p-diethyl aminobenzoate; peroxides such as benzoyl peroxide, di-t-butyl peroxide, dicumyl peroxide, and cumene hydroperoxide; acridine derivatives such as 9-phenyl acridine, 9-p-methoxyphenyl acridine, 9-acetyl aminoacridine, and benzacridine; phenadine derivatives such as 9.10-dimethyl benzphenadine, 9-methyl benzphenadine, and 10-methoxy benzphenadine; 4',4",6-trimethoxy-2,3-diphenyl quinoxaline derivative; 2,4,5-triphenyl imidazoyl dimer; ketone halide; and acylated phosphoric acid compounds such as acylphosphinoxide, and acylphosphonate.

Examples activated by visible rays include, among others, 2-nitrofluolene, 2,4,6-triphenylpyridium tetrafluoro borate, 2,4,6-tris(trichloromethyl)-1,3,5-triazine, 3,3'-carbonyl biscumarine, and thio Michler's ketone.

In the electrically conductive paint composition of the invention, the content of the photopolymerization initiator (C) is 0.1 to 20 parts by weight, preferably 0.5 to 15 parts by weight, to 100 parts by weight of the (meth)acrylate compound (A) because the sensitivity to the active ray is lowered to make curing insufficient if too less, or the increasing effect of sensitization is hardly noted if contained more than a specific amount. It is desired to add the photopolymerization initiator after polymerization of the anilinic monomer.

d) The electrically conductive composition of the invention may contain organic solvent, dispersant, sensitizer, ultraviolet absorber, thermopolymerization inhibitor, antioxidant, surface reformer, defoaming agent, and others as required.

The electrically conductive composition of the invention is obtained by stirring a (meth)acrylate monomer (A), an anilinic electrically conductive polymer (B), and a photopolymerization initiator (C) by means of dissolver, attriter, three rolls, and others.

The prepared electrically conductive composition is applied on the objects such as plastic forms by general methods such as spray method, bar coating method, doctor blade method, dipping method, spin coating method, and roll coater method.

After applying the electrically conductive paint composition on the object, if the solvent is contained, it is dried by hot air, infrared ray or the like, and irradiated with active rays of light such as ultraviolet ray and visible ray, so that the paint composition is cured, thereby obtaining a coating layer of the electrically conductive paint.

The thickness of the electrically conductive coating layer is desired to be 0.1 to 10 μm, more preferably 0.5 to 5 μm, because the electrical conductivity and abrasion resistance are lowered and the preventive effect of metal pollution in the case of lamination of inorganic conductive layer mentioned later is also lowered if too thin, or the transparency is lowered if too thick.

Objects of application of the electrically conductive composition include, for example, plastic forms of a film, a sheet, a plate, a cabinet of the like of polyethylene, polypropylene, polyvinyl chloride, polycarbonate, polymethacrylate, ABS resin, etc., glass plates, and others.

By the application of the electrically conductive composition, an antistatic form possessing an electrically conductive coating layer on the surface is obtained.

For irradiation of active ray, for example, high pressure mercury lamp, halogen lamp, xenon lamp, nitrogen laser, He-Ne laser, Ar laser, and the like may be employed, and the irradiation time is usually desired somewhere between 1 and 60 minutes, although variable with the concentration of the electrically conductive composition, type of light source, intensity, etc.

The irradiation intensity of active rays is preferred to be 500 to 2000 $mJ/cm^2$ because the reactivity of photopolymerization is lowered and the hardness of the obtained coating layer is lowered if too weak, and the reactivity of photopolymerization is not increased above a certain intensity.

The irradiation time of active rays is preferred to be 1 to 60 minutes because the reactivity of photopolymerization is lowered and the hardness of the obtained coating layer is lowered if too short, and the photopolymerization does not proceed if longer a certain time.

e) The electrically conductive composition of the invention may contain, aside from the electrically conductive composition comprising (A) 100 parts by weight of a (meth)acrylate compound possessing at least two (meth)acryloyl groups, (B) 1 to 100 parts by weight of an anilinic electrically conductive polymer, and (C) 0.1 to 20 parts by weight of a photopolymerization initiator sensitized by active rays of light, (D) an unsaturated compound possessing at least one group selected from the group consisting of a phosphoric acid group, a sulfonic acid group, and a carboxyl group.

By the addition of the unsaturated compound (D), the formed coating layer becomes excellent in transparency and electrical conductivity.

The content of the unsaturated compound (D) is preferred to be 0.1 to 30 parts by weight, or more preferably 1 to 20 parts by weight, of 100 parts by weight of the (meth)acrylate compound (A) because the electrical conductivity of the obtained coating layer is lowered if too less, and the transparency of the obtained coating layer is lowered if too much.

As the unsaturated compound (D), of the compounds listed above as the examples of the dopant for composing the anilinic electrically conductive polymer, any unsaturated compound possessing any one group selected from the group consisting of a phosphoric acid group, a sulfonic group, and a carboxyl group can be used.

f) Between the surface of the form to be painted, and the coating layer made of the organic electrically conductive composition of the invention, that is, the organic electrically conductive coating layer, an inorganic electrically conductive layer made of inorganic electrically conductive powder and synthetic resin may be provided. Thus obtained antistatic form possesses an electrical conductivity, and is excellent in transparency and abrasion resistance. Besides, since inorganic conductive material is not used in the surface conductive coating layer, metalic impurities are not released, so that it may be preferably used as the antistatic material for products related to semiconductor, and the like.

The inorganic conductive powder is the tin oxide powder containing antimony with mean particle size of 0.01 to 0.4 μm, or the barium sulfate powder coated with tin oxide containing antimony with mean particle size of 0.01 to 2 μm, and the inorganic conductive layer is formed of inorganic conductive paint composition from the inorganic conductive powder and synthetic resin.

The mean particle size of the tin oxide powder containing antimony is 0.01 to 0.4 μm, or preferably 0.01 to 0.1 μm because the conductive powder scatters the visible rays to lower the transparency of the obtained inorganic conductive layer if too large, or the electrical conductivity of the obtained inorganic conductive layer is lowered, the tin oxide is likely to sediment, and the paint is likely to gelate if too small.

The content of the antimony is desired to be 0.1 to 20 wt. % because the electrical conductivity of the inorganic conductive layer is lowered if too small, or the transparency of the obtained inorganic conductive layer is lowered if too much. Such tin oxide powder containing antimony is distributed by Mitsubishi Material Co. in the tradename of T-1.

The mean particle size of the barium sulfate powder coated with tin oxide containing antimony is 0.01 to 2 μm, or preferably 0.1 to 0.5 μm because the transparency of the obtained inorganic conductive layer is lowered if too small, and the smoothness of the inorganic conductive layer surface is lowered if too large. Such barium sulfate powder coated with tin oxide containing antimony is distributed by Mitsui Metal Co. in the tradename of Pastran Type-IV.

As the synthetic resin for composing the inorganic conductive layer, an unsaturated compound (E) possessing at least two (meth)acryloyl groups within a molecule is desired. As the unsaturated compound (E), the aforesaid unsaturated compound (C) may be used.

The content of the inorganic conductive powder is preferably 100 to 10,000 parts by weight to 100 parts by weight of the unsaturated compound (E), or preferably 150 to 1,000 parts by weight. If more than 10,000 parts by weight, the transparency of the obtained inorganic conductive layer is lowered, and if less than 100 parts by weight, the electrical conductivity of the obtained inorganic conductive layer is lowered.

To form the inorganic conductive layer, the inorganic conductive paint composition is applied on the surface of the form to be coated, and is cured by irradiating with active rays.

It is also preferred to treat the surface of the inorganic conductive layer by buffing.

The coating method of the inorganic conductive paint is substantially same as the coating method of the organic conductive paint composition of the invention explained above.

The thickness of the inorganic conductive layer is 0.5 to 10 μm, or preferably 1 to 5 μm because the electrical conductivity and abrasion resistance of the layer are lowered if too thin, or the transparency of the layer is lowered if too thick. The irradiation amount of the active rays is desired so that the cumulative exposure may be 500 mJ/cm$^2$ or more because curing of the inorganic conductive layer is insufficient, and the abrasion resistance, hardness and adhesion to the object of this layer are lowered if too small.

Some of the preferred embodiments of the invention are described in detail below.

EXAMPLE 1

In a separable flask reactor furnished with a condenser, an agitator and a dropping funnel, 500 ml of concentrated hydrochloric acid and 36.5 ml of aniline (0.4 mol equivalent) were charged, and while suppressing temperature rise in a water bath, 500 ml of concentrated hydrochloric acid dissolving 91 g of ammonium peroxodisulfate was dripped in 30 minutes, and agitated for 3 hours, and the precipitate was filtered, and a green powder of anilinic conductive polymer was obtained.

The green powder was washed in 10% aqueous solution of sodium hydroxide, then washed in water and methanol, and anilinic polymer powder was obtained.

Charging 80 g of this anilinic polymer powder, 80 g of 2-acryloyl oxyethyl acid phosphate [Light Ester PA, tradename of Kyoei-sha Chemical Co., k=1, $R^3=R^4=R^5=H$ in formula (II)] as a dopant, and 400 mg of methyl ethyl ketone, anilinic conductive polymer dispersion was obtained by agitating for 2 hours by dissolver.

To 350 g of the obtained anilinic conductive polymer dispersion (100 g of solid content, consisting of 50 g of anilinic polymer and 50 g of a dopant), 200 g of pentaerythritol triacylate, 200 g of 1,6-bis(3-acryloxy-2-hydroxy propyl)hexyl ether, 30 g of benzophenone, and 10 g of Michler's ketone were added, and agitated for 1 hour, and an electrically conductive composition was obtained. This electrically conductive composition was applied on a transparent acrylic plate in 3 μm (thickness after drying), and an exposure of 1000 mJ/cm$^2$ was emitted by a superhigh pressure mercury lamp, and an electrically conductive coating layer was formed.

EXAMPLES 2, 3

Electrically conductive coating layers were formed from the electrically conductive compositions in the same procedure as in Example 1, except that the anilinic conductive polymer dispersion obtained in Example 1 was used by 210 g (solid content 60 g) in Example 2, and 70 g (solid content 20 g) in Example 3.

EXAMPLE 4

Anilinic conductive polymer powder was obtained in the same procedure as in Example 1, except that acid phosphoxy polyoxy ethylene glycol monomethacrylate [Phosmer PE, tradename of Uni Chemical Co., k=4.5, $R^3=R^4=H$, $R^5=CH_3$ in formula (II)] was used as the dopant instead of 2-acryloyl oxyethyl acid phosphate.

To 30 g of the obtained anilinic conductive polymer (15 g of anilinic polymer, 15 g of dopant), 100 g of acrylate oligomer (Aronix M-9050, tradename of Toa Synthetic Chemical Co.), 100 g of 1,6-bis(3-acryloxy-2-hydroxypropyl)hexyl ether, 30 g of benzophenone, and 10 g of Michler's ketone were added and stirred for 2 hours, and an electrically conductive composition was obtained. From this electrically conductive composition, an electrically conductive coating layer was formed in the same manner as in Example 1.

EXAMPLE 5

In a separable flask reactor furnished with a condenser, an agitator and a dropping funnel, 500 ml of deionized water, 160 g of acid phosphoxy polyoxy ethylene glycol monomethacrylate same as used in Example 4, and 36.5 ml of aniline were charged, and 500 ml of aqueous solution dissolving 91 g of ammonium peroxodisulfate was dripped in 30 minutes, and agitated for 3 hours, and the precipitate was filtered, and a green powder of anilinic polymer was obtained.

As a result of element analysis of this powder, the rate of the anilinic polymer corresponding to formula (I) was 30 wt. %. To 60 g of this anilinic conductive polymer (45.6 g of anilinic polymer and 14.4 g of dopant), 100 g of pentaerythritol triacrylate, 100 g of 1,6-bis(3-acryloxy-2-hydroxypropyl)hexyl ether, 20 g of benzophenone, and 8 g of Michler's ketone were added and stirred for 2 hours, and an electrically conductive composition was obtained. From this electrically conductive composition, an electrically conductive coating layer was formed in the same manner as in Example 1.

EXAMPLE 6

An electrically conductive coating layer was formed after obtaining an electrically conductive composition in the same procedure as in Example 1, except that benzophenone was used by 3 g, and Michler's ketone by 1 g.

EXAMPLE 7

An electrically conductive coating layer was formed after obtaining an electrically conductive composition in the same procedure as in Example 2, except that benzophenone was used by 3 g, and Michler's ketone by 1 g.

EXAMPLE 8

An electrically conductive coating layer was formed after obtaining an electrically conductive composition in the same procedure as in Example 3, except that benzophenone was used by 3 g, and Michler's ketone by 1 g.

EXAMPLE 9

An anilinic conductive polymer dispersion was obtained (in 350 g of dispersion, solid content was 102 g, that is, consisting of 49 g of anilinic polymer and 53 g of dopant) in the same manner as in Example 1, except that 85 g of phosphoric acid was used instead of 2-acryloyl oxyethyl acid phosphate in Example 1. From this polymer, an electrically conductive composition was obtained in the same manner as in Example 1, and an electrically conductive coating layer was formed.

COMPARATIVE EXAMPLES 1, 2, 3

Electrically conductive coating layers were formed after obtaining electrically conductive compositions in the same procedure as in Example 1, except that the anilinic conductive polymer prepared in Example 1 was not used at all (Comparative Example 1), used by 4 g (2 g of anilinic polymer, 2 g of the dopant) (Comparative Example 2), or used by 800 g (400 g of anilinic polymer, 400 g of dopant) (Comparative Example 3).

COMPARATIVE EXAMPLE 4

Charging 30 g of methyl methacrylate/β-hydroxy ethyl methacrylate copolymer (weight-average molecular weight: 45,000), 200 g of toluene, and 63.2 g of the tin oxide powder containing antimony with particle size of 0.1 μm in a ball mill, an electrically conductive composition was obtained by dispersing for 48 hours.

From this electrically conductive composition, an electrically conductive coating layer was formed in the same manner as in Example 1.

COMPARATIVE EXAMPLES 5, 6, 7

Electrically conductive coating layers were formed after obtaining an electrically conductive compositions in the same procedure as in Example 6, except that the anilinic conductive polymer prepared in Example 1 was not used at all (Comparative Example 5), used by 4 g (2 g of anilinic polymer, 2 g of the dopant) (Comparative Example 6), or used by 800 g (400 g of anilinic polymer, 400 g of the dopant) (Comparative Example 7).

EXAMPLE 10

In a separable flask reactor furnished with a condenser, an agitator and a dropping funnel, 500 ml of aqueous solution of 1 normal of hydrochloric acid and 36.5 ml of aniline (0.4 mol equivalent) were charged, and while suppressing temperature rise in a water bath, 500 ml of the aqueous solution dissolving 91 g of ammonium peroxodisulfate was dripped in 30 minutes, and agitated for 3 hours, and the precipitate was filtered, and a green powder of anilinic conductive polymer was obtained.

The green powder was put in 500 ml of aqueous solution 1 normal of ammonia, and the acid was removed by stirring, and the powder was filtered and washed by sufficient water to be de-doped, and the powder was put in 1000 ml of aqueous solution dissolving 100 g of 2-acrylamido-2-methyl propane sulfonic acid to be doped, and anilinic conductive polymer powder was obtained. As a result of element analysis of the powder, the rate of the anilinic conductive polymer corresponding to formula (VI) was 47 wt. %.

To 200 g of the anilinic conductive polymer powder (136 g of anilinic polymer and 64 g of the dopant), 200 g of pentaerythritol triacrylate, 200 g of 1,6-bis(3-acryloxy-2-hydroxy propyl)hexyl ether, 30 g of benzophenone, and 10 g of Michler's ketone were added, and agitated for 1 hour, and an electrically conductive composition was obtained. This electrically conductive composition was applied on a transparent acrylic plate in a thickness of 3 μm, and an exposure of 1000 mJ/cm$^2$ was emitted by a superhigh pressure mercury lamp, and an electrically conductive coating layer was formed.

EXAMPLES 11, 12

Electrically conductive compositions were prepared in the same procedure as in Example 10, except that the anilinic conductive polymer powder obtained in Example 10 was used by 100 g (68 g of anilinic polymer and 32 g of the dopant) (Example 11), and 50 g (34 g of anilinic polymer and 16 g of the dopant) (Example 12), and electrically conductive coating layers were formed from these compositions.

EXAMPLE 13

By passing an aqueous solution dissolving 164 g (0.8 mol equivalent) of p-styrene sulfonic sodium in 1000 ml of deionized water through a column packed with cation exchange resin, an aqueous solution of p-styrene sulfonic acid was prepared.

In a separable flask reactor furnished with a condenser, an agitator and a dropping funnel, 500 ml of the obtained aqueous solution and 36.5 ml of aniline (0.4 mol equivalent)

were charged, and while suppressing temperature rise in a water bath, 500 ml of the aqueous solution dissolving 91 g of ammonium peroxodisulfate was dripped in 30 minutes, and agitated for 3 hours, and the precipitate was filtered, and a green powder of anilinic conductive polymer was obtained.

As a result of element analysis of the anilinic conductive polymer powder, the rate of the anilinic conductive polymer corresponding to formula (VI) was 32 wt. %.

To 100 g of the anilinic conductive polymer powder (79 g of anilinic polymer and 21 g of dopant), 100 g of pentaerythritol triacrylate, 100 g of 1,6-bis(3-acryloxy-2-hydroxy propyl)hexyl ether, 20 g of benzophenone, and 8 g of Michler's ketone were added, and agitated for 1 hour, and an electrically conductive composition was prepared. From this electrically conductive composition, an electrically conductive coating layer was formed in the same manner as in Example 10.

EXAMPLE 14

An aqueous solution was prepared by dissolving 160 g (0.8 mol equivalent) of 2-acrylamido-2-methyl propane sulfonic acid in 1000 ml of deionized water.

In a separable flask reactor furnished with a condenser, an agitator and a dropping funnel, 500 ml of the obtained aqueous solution and 36.5 ml of aniline (0.4 mol equivalent) were charged, and while suppressing temperature rise in a water bath, 500 ml of the aqueous solution dissolving 91 g of ammonium peroxodisulfate was dripped in 30 minutes, and agitated for 3 hours, and the precipitate was filtered, and a green powder of anilinic conductive polymer was obtained.

This green powder was washed in 10% aqueous solution of sodium hydroxide, and further washed in water and methanol, and anilinic conductive polymer powder was obtained.

As a result of element analysis of the anilinic conductive polymer powder, the rate of the anilinic conductive polymer corresponding to formula (VI) was 43 wt. %.

To 200 g of the anilinic conductive polymer powder (140 g of anilinic polymer and 60 g of the dopant), 200 g of pentaerythritol triacrylate, 200 g of 1,6-bis (3-acryloxy-2-hydroxy propyl)hexyl ether, 3 g of benzophenone, and 1 g of Michler's ketone were added, and agitated for 1 hour, and an electrically conductive composition was prepared. From this electrically conductive composition, an electrically conductive coating layer was formed in the same manner as in Example 10.

EXAMPLES 15, 16,

Electrically conductive compositions were prepared in the same procedure as in Example 14, except that the anilinic conductive polymer powder obtained in Example 14 was used by 100 g (70 g of anilinic polymer and 30 g of the dopant) (Example 15), and 50 g (35 g of anilinic polymer and 30 g of the dopant) (Example 16), and electrically conductive coating layers were formed from these compositions.

EXAMPLE 17

An anilinic conductive polymer powder was obtained in the same manner as in Example 10, except that 85 g of sulfuric acid was used instead of 2-acrylamido-2-methyl propane sulfonic acid in Example 10.

As a result of element analysis of the anilinic conductive polymer powder, the rate of the anilinic conductive polymer corresponding to formula (VI) was 40 wt. %.

Using 200 g of this anilinic conductive polymer powder (159 g of anilinic polymer and 41 g of the dopant), an electrically conductive composition was obtained in the same manner as in Example 10, and an electrically conductive coating layer was formed.

COMPARATIVE EXAMPLES 8, 9

Electrically conductive compositions were prepared in the same procedure as in Example 10, except that the anilinic conductive polymer powder obtained in Example 10 was used by 4 g (2.72 g of anilinic polymer and 1.28 g of the dopant) (Comparative Example 8), and 800 g (544 g of anilinic polymer and 256 g of the dopant) (Comparative Example 9), and electrically conductive coating layers were formed from these compositions.

COMPARATIVE EXAMPLES 10, 11

Electrically conductive compositions were prepared in the same procedure as in Example 14, except that the anilinic conductive polymer powder obtained in Example 14 was used by 4 g (2.8 g of anilinic polymer and 1.2 g of the dopant) (Comparative Example 10), and 800 g (560 g of anilinic polymer and 240 g of the dopant) (Comparative Example 11), and electrically conductive coating layers were formed from these compositions.

EXAMPLE 18

In a separable flask with an agitator, 160 g of p-toluene sulfonic acid and 1000 ml of deionized water were charged, and stirred to dissolve, and an aqueous solution of p-toluene sulfonic acid was obtained. The obtained aqueous solution of p-toluene sulfonic acid was divided into two portions of 500 ml each, and 36.5 g of aniline was charged in one, and 91 g of ammonium peroxodisulfate was charged in the other to dissolve, and an aqueous solution of p-toluene sulfonic acid containing aniline and an aqueous solution of p-toluene sulfonic acid containing ammonium peroxodisulfate were obtained.

The obtained aqueous solution of toluene sulfonic acid containing aniline was supplied in a separable flask reactor furnished with a condenser, an agitator and a dropping funnel, and while suppressing temperature rise in a water bath, the obtained aqueous solution of p-toluene sulfonic acid containing ammonium peroxodisulfate was dripped in 30 minutes by a dropping funnel, and agitated for 3 hours, and a precipitate was obtained. The obtained precipitate was filtered and washed in methanol, and a green powder of anilinic conductive polymer was obtained.

Charging 50 g of the obtained anilinic conductive polymer and 150 g of ethyl cellosolve in a dissolver to disperse for 24 hours, a dispersion of anilinic conductive polymer with solid content of 25 wt. % was obtained (p-toluene sulfonic acid dopant 31 wt. %).

In a separable flask with an agitator, 40 g of the obtained dispersion of anilinic conductive polymer (10 g of solid content, 6.9 g of anilinic polymer, and 3.1 g of dopant), 100 g of pentaerithritol triacrylate, 4 g of benzophenone, and 1 g of Michler's ketone were put and stirred, and an electrically conductive composition was obtained.

The obtained electrically conductive composition was applied on an acrylic plate by bar coating, and the bar coated portion was cured by irradiating with 1000 mJ/cm$^2$ of rays by high pressure mercury lamp, and an electrically conductive coating layer of 4 μm in thickness was obtained.

EXAMPLE 19, COMPARATIVE EXAMPLE 12

Electrically conductive coating layers were formed in the same manner as in Example 18, except that the dispersion of anilinic conductive polymer obtained in Example 18 was used by 20 g (Example 19) or 5 g (Comparative Example 12).

EXAMPLE 20

In a separable flask with an agitator, 40 g of the dispersion of anilinic conductive polymer obtained in Example 18, 100 g of pentaerythritol triacrylate, 1 g of 2-acryloyl oxyethyl acid phosphate (Light Ester PA, tradename of Kyoei-sha Chemical Co.), 4 g of benzophenone, 1 g of Michler's ketone, and 100 g of methyl ethyl ketone were charged and stirred, and an electrically conductive composition was obtained, and using the obtained electrically conductive composition, an electrically conductive coating layer was obtained in the same manner as in Example 18.

EXAMPLES 21, 22

Electrically conductive coating layers were formed in the same manner as in Example 20, except that 2-acryloyl oxyethyl acid phosphate was used by 3 g (Example 21), or 20 g (Example 22).

EXAMPLES 23, 24

Electrically conductive coating layers were formed in the same manner as in Example 20, except that 2-acryloyl oxyethyl acid phosphate was replaced by 3 g of 2-acrylamido-2-methyl propane sulfonic acid (TBAS-Q, tradename of Nitto Chemical Co.) (Example 23), or 3 g of acid phosphoxy polyoxy ethylene glycol monomethacrylate (Phosmer PE, tradename of Uni Chemical Co.) (Example 24).

EXAMPLE 25

An electrically conductive coating layer was formed in the same manner as in Example 20, except that p-toluene sulfonic acid and deionized water as the dopant were replaced by 229 g (0.84 mol equivalent) of sodium dodecane sulfonate, and 500 ml of ion exchange water treated with cation exchange resin (7.1 g of anilinic polymer and 2.9 g of dopant), pentaerythritol triacrylate by 100 g of dipentaerythritol hexacrylate, and the initiator by 4 g of dimethyl amino acetophenone.

EXAMPLES 26, 27

Electrically conductive coating layers were formed in the same manner as in Example 25, except that 2-acryloyl oxyethyl acid phosphate was replaced by acid phosphoxy polyethylene glycol monomethacrylate (Example 26), or 2-acrylamido-2-methylpropane sulfonic acid (Example 27).

EXAMPLE 28

An electrically conductive coating layer was formed in the same manner as in Example 25, except that dodecane sulfonic acid as dopant was replaced by dodecyl benzene sulfonic acid (7.0 g of anilinic polymer and 3.0 g of dopant).

EXAMPLE 29

An electrically conductive coating layer was formed in the same manner as in Example 20, except that p-toluene sulfonic acid as dopant was replaced by 2-acryloyl oxyethyl acid phosphate (7.3 g of anilinic polymer and 2.7 g of the dopant), pentaerythritol triacrylate by 100 g of dipentaerythritol hexacrylate, and the initiator by 4 g of dimethyl amino acetophenone.

EXAMPLE 30

An electrically conductive coating layer was formed in the same manner as in Example 29, except that 2-acryloyl oxyethyl acid phosphate as the dopant and acid additive was replaced by acid phosphoxy polyethylene glycol monomethacrylate (7.6 g of anilinic polymer and 2.4 g of the dopant).

EXAMPLE 31

An electrically conductive coating layer was formed in the same manner as in Example 29, except that 2-acryloyl oxyethyl acid phosphate as the dopant and acid additive was replaced by 2-acrylamido-2-methyl propane sulfonic acid (7.0 g of anilinic polymer and 3.0 g of the dopant).

EXAMPLE 32

In an attriter, 35 g of dipentaerythritol hexacrylate, 0.1 g of hydroquinone, 350 g of ethyl cellosolve, 1 g of 2,4-diethyl thioxanthone, and 1 g of dimethyl amino acetophenone were charged, mixed and dispersed. Further, while stirring the dispersion, 100 g of the tin oxide powder with mean particle size of 0.02 μm containing antimony (T-1, tradename of Mitsubishi Material Co.), and 16 g of polyvinyl butyral with the rate of 34% of remaining hydroxyl group to all hydroxyl group, acetal forming degree of 65% by butyl aldehyde, rate of 1% of acetyl group in all hydroxyl group, and mean degree of polymerization of 1900 were added to the dispersion in 20 minutes. Dispersing further for 10 hours, an inorganic conductive paint composition was obtained.

The obtained composition was applied on the surface of an acrylic resin plate in a thickness of 1.5 μm of the inorganic electrically conductive layer by spin coating method, and dried in hot air for 10 minutes at 50° C., and was irradiated with active rays of light by a high pressure mercury lamp (300 W) so that the total exposure of the active rays may be 1,800 mJ/cm$^2$ to be cured, and an inorganic electrically conductive layer was formed on the surface of the acrylic resin plate.

In a separable flask reactor furnished with a condenser, an agitator and a dripping funnel, 500 ml of hydrochloric acid of 35 wt. % and 36.5 ml of aniline were supplied, and while suppressing temperature rise in water bath, 500 ml of hydrochloric acid of 35wt. % containing 91 g of ammonium peroxodisulfate was added in 30 minutes, and stirred for 3 hours. The obtained precipitate was filtered, and a green powder of polyaniline conductive polymer was obtained.

In an attriter, 5 g of this doped polyaniline powder, 50 g of pentaerythritol triacrylate, 50 g of 1, 6-bis(3-acryloxy-2-hydroxy propyl)hexyl ether, 3 g of benzophenone, 1 g of Michler's ketone, 1 g of hydroquinone, and 150 g of ethyl cellosolve were supplied, and stirred for 12 hours, and an organic electrically conductive composition was obtained.

This organic electrically conductive composition was applied on an inorganic conductive layer treated by buffing or not, same as the inorganic conductive paint composition, and was irradiated with active rays to be cured, thereby obtaining an antistatic transparent sheet having an organic electrically conductive coating layer laminated on an inorganic electrically conductive layer.

COMPARATIVE EXAMPLE 13

In a laboplastomill, 10 g of anilinic conductive powder synthesized in Example 18 was charged together 100 g of polypropylene resin (Milason 12, tradename of Mitsui Petrochemical Co.), and melted and kneaded at 180° C., and a resin mixture was obtained, and it was formed into a sheet by means of a press.

COMPARATIVE EXAMPLE 14

In a separable flask reactor furnished with a condenser, an agitator and a dropping funnel, 200 g of deionized water and 680 g of pyrrole were supplied and stirred, and further 5.4 g of potassium peroxodisulfate was dissolved in 100 g of deionized water and dropped, and allowed to react overnight at room temperature. The formed black precipitate was filtered, and, washed sufficiently in deionized water. Drying for 6 hours at 50° C., 100 g of polypyrrole powder was obtained.

This polypyrrole powder was immersed in a solution having 1 g of iodine dissolved in 50 ml of hexane, and stirred and mixed for 10 minutes, and hexane was removed, the residue was dried, and the iodine was doped.

After stirring and dispersing 10 g of iodine doped polypyrrole powder and 170 g of ethyl cellosolve for 12 hours, 50 g of pentaerythritol triacrylate, 50 g of 1,6-bis(3-acryloxy-2-hydroxypropyl)hexane diol, 3 g of benzophenone, 1 g of Michler's ketone, and 1 g of hydroquinone were added, and the mixture was further stirred for 30 minutes, and a polypyrrole dispersion was obtained.

This polypyrrole dispersion was applied on an acrylic plate in a dry thickness of 3 μm by spin coating, and was cured by irradiating with high pressure mercury lamp (300 W) for 10 minutes, thereby forming an electrically conductive coating layer.

PERFORMANCE TESTS

Electrically conductive coating layers obtained in Examples and Comparative Examples were tested in the following performance items.

(1) Surface intrinsic resistance

The test conformed to ASTM D 257, and the alkali resistance was evaluated. That is, the coating layer was immersed in 10% aqueous solution of sodium hydroxide, and kept at 30° C., and the surface intrinsic resistance ($\Omega/\square$) of the coating layer was measured after specific lapse of time (0, 10, 20, 100, and 200 minutes).

(2) Total ray transmissivity and haze

The total ray transmissivity and haze were tested in accordance with ASTM D 1003.

(3) Pencil hardness

This hardness test conformed to JIS K 5400. That is, using pencils with the hardness of 9H to 6B sequentially from 9H, the coating layer surface was scratched five times at different positions, and the hardness of the pencil was investigated when the tear of the coating layer reaching up to the acrylic plate was less than two out of five times.

The test results of (1), (2), (3) are shown in Tables 1 to 5.

(4) Abrasion resistance

After the testing of the sheet obtained in Example 32 conforming to JIS K 7204 (Taber abrasion ring CS 10×500 g load×100 cycles), the surface intrinsic resistance, pencil hardness, and haze were measured. The results are shown in Table 6.

(5) Analysis of degree of elution of the dopant

A plate of Example 18 and a sheet of Comparative Example 13 were cut in 1 cm square pieces, and each sample piece was put in 20 ml of ion exchange water, and stood for 24 hours at 25° C. In these test solutions, changes of pH were traced. In this test, the resistance to environmental pollution by suppression of the dopant elution was evaluated. The result is shown in Table 7.

It is known from Table 7 that the the dopant was not eluted at ail from the coating layer (Example 18) formed by coating by electrically conductive composition of this invention, suggesting that the environmental pollution was low.

(6) Test about compatibility of transparency and electrical conductivity

The electrically conductive coarting layer of polypyrrole in Comparative Example 14 and the electrically conductive coating layer of polyaniline in Example 1 were compared. The test result is shown in Table 8.

(7) Determination of metal content in the surface of the coating layer

In the surface of the coating layer obtained in Comparative Example 4 and Example 26, the metal content in the surface was determined by fluorescent X-ray analysis. The test result is shown in Table 9.

TABLE 1

|  | Surface intrinsic resistance ($\Omega/\square$) | Haze (%) | Pencil hardness |
|---|---|---|---|
| Examples |  |  |  |
| 1 | $3.0 \times 10^7$ | 7.8 | 4H |
| 2 | $2.0 \times 10^8$ | 7.2 | 4H |
| 3 | $7.0 \times 10^8$ | 6.8 | 4H |
| 4 | $1.0 \times 10^7$ | 8.1 | 5H |
| 5 | $4.0 \times 10^7$ | 7.6 | 5H |
| 6 | $4.0 \times 10^7$ | 7.9 | 4H |
| 7 | $2.0 \times 10^8$ | 7.1 | 4H |
| 8 | $3.0 \times 10^8$ | 6.8 | 4H |
| 9 | $3.0 \times 10^8$ | 8.0 | 3H |
| Comparative Examples |  |  |  |
| 1 | $2.0 \times 10^{14}$ | 2.1 | 4H |
| 2 | $2.0 \times 10^{12}$ | 2.9 | 5H |
| 3 | $2.0 \times 10^6$ | 14.5 | 3H |
| 4 | $6.0 \times 10^7$ | 6.8 | 2H |
| 5 | $2.0 \times 10^{14}$ | 2.0 | 4H |
| 6 | $2.0 \times 10^{12}$ | 3.0 | 5H |
| 7 | $5.0 \times 10^6$ | 14.5 | 3H |

TABLE 2

|  | Surface intrinsic resistance ($\Omega/\square$) | Haze (%) | Pencil hardness |
|---|---|---|---|
| Examples |  |  |  |
| 10 | $6.0 \times 10^6$ | 6.2 | 4H |
| 11 | $3.0 \times 10^7$ | 5.8 | 4H |
| 12 | $3.0 \times 10^8$ | 5.1 | 4H |
| 13 | $2.0 \times 10^8$ | 7.9 | 5H |
| 14 | $5.0 \times 10^6$ | 6.3 | 4H |
| 15 | $2.0 \times 10^7$ | 5.8 | 4H |
| 16 | $3.0 \times 10^8$ | 5.2 | 4H |
| 17 | $3.0 \times 10^8$ | 8.0 | 4H |
| Comparative Examples |  |  |  |
| 8 | $1.0 \times 10^{12}$ | 2.5 | 6H |
| 9 | $2.0 \times 10^5$ | 13.8 | 3H |
| 10 | $2.0 \times 10^{12}$ | 2.6 | 6H |
| 11 | $1.0 \times 10^6$ | 14.0 | 3H |

TABLE 3

|  | Examples | | Comparative Examples |
|---|---|---|---|
|  | 18 | 19 | 12 |
| Pencil hardness | 6H | 6H | 7H |
| Surface intrinsic resistance ($\Omega/\square$) | | | |
| 0 min. | $1.5 \times 10^8$ | $2 \times 10^9$ | $1 \times 10^{14}$ |
| 10 min. | $2 \times 10^{10}$ | $2 \times 10^{10}$ | $1 \times 10^{14}$ |
| 20 min. | $2 \times 10^{10}$ | $8 \times 10^{10}$ | $1 \times 10^{14}$ |
| 100 min. | $1 \times 10^{10}$ | $1 \times 10^{11}$ | $1 \times 10^{14}$ |
| 200 min. | $5 \times 10^{10}$ | $1 \times 10^{11}$ | $1 \times 10^{14}$ |

TABLE 4

| Examples | Total ray transmissivity | Haze (%) | Surface intrinsic resistance ($\Omega/\square$) |
|---|---|---|---|
| 20 | 86.0 | 0.8 | $5 \times 10^7$ |
| 21 | 85.7 | 1.0 | $1.5 \times 10^7$ |
| 22 | 83.2 | 2.6 | $3 \times 10^6$ |
| 23 | 84.5 | 1.4 | $2 \times 10^7$ |
| 24 | 85.0 | 1.2 | $8 \times 10^7$ |

TABLE 5

| Examples | Total ray transmissivity (%) | Haze (%) | Surface intrinsic resistance ($\Omega/\square$) | Surface pencil hardness |
|---|---|---|---|---|
| 25 | 83.7 | 2.5 | $3 \times 10^6$ | 5H |
| 26 | 84.0 | 2.3 | $2 \times 10^6$ | 5H |
| 27 | 82.1 | 3.1 | $3 \times 10^6$ | 5H |
| 28 | 85.0 | 2.3 | $2 \times 10^6$ | 5H |
| 29 | 82.9 | 2.6 | $4 \times 10^6$ | 6H |
| 30 | 83.2 | 2.5 | $3 \times 10^6$ | 6H |
| 31 | 82.5 | 3.2 | $5 \times 10^6$ | 6H |

TABLE 6

| | Before taber abrasion | | | After taber abration | | |
|---|---|---|---|---|---|---|
| Ex. 32 | Surface intrinsic resistance ($\Omega/\square$) | Pencil hardness | Haze (%) | Surface intrinsic resistance ($\Omega/\square$) | Pencil hardness | Haze (%) |
| No buffing treatment | $10^6$ | 5H | 4 | $10^6$ | 5H | 5 |
| Buffing treatment | $10^6$ | 5H | 3 | $10^6$ | 5H | 5 |

TABLE 7

|  | After charge | After 1 minute | After 30 minutes | After 24 hours |
|---|---|---|---|---|
| Example 18 | 7.79 | 7.79 | 7.79 | 7.78 |
| Comparative Example 13 | 7.78 | 7.77 | 6.92 | 6.30 |

TABLE 8

|  | Surface intrinsic resistance ($\Omega/\square$) | Haze (%) |
|---|---|---|
| Comparative Example 14 | $1 \times 10^{10}$ | 23 |
| Example 1 | $3 \times 10^7$ | 7.8 |

TABLE 9

| Determined elements | Comparative Example 4 (Tin oxide) (%) | Example 26 (Polyaniline) (%) |
|---|---|---|
| Na | 1.84 | —* |
| K | 2.60 | 0.01 |
| Al | 0.04 | 0.03 |
| P | 0.02 | 0.02 |
| S | 0.13 | —* |
| Cr | 0.04 | —* |
| Fe | 0.11 | —* |
| Ni | 0.15 | —* |
| Cu | 0.07 | —* |
| Zn | 0.12 | —* |
| Cl | 10.87 | —* |
| Sn + Sb | 56.08 | —* |

*: below determination limitation (0.01%)

What is claimed is:

1. An electrically conductive composition comprising 100 parts by weight of a (meth)acrylate compound possessing at least two(meth)acryloyl groups, 5 to 100 parts by weight of an anilinic electrically conductive polymer composed of a salt of anilinic polymer and a dopant which is an unsaturated compound possessing at least one group selected from the group consisting of phosphoric acid group and sulfonic acid group, and 0.1 to 20 parts by weight of a photopolymerization initiator sensitized by active rays.

2. An electrically conductive composition according to claim 1, wherein the unsaturated compound possessing the phosphoric acid group is (meth)acrylate selected from the group consisting of acid phosphoxy polyethylene glycol mono(meth)acrylate, acid phosphoxy ethyl (meth)acrylate, 3-chloro-2-acid phosphoxy propyl (meth)acrylate, acid phosphoxy propyl (meth)acrylate, acid phosphoxy polyoxy ethylene glycol mono(meth)acrylate, and acid phosphoxy polyoxy propylene glycol mono(meth)acrylate.

3. An electrically conductive composition according to claim 1, wherein the unsaturated compound possessing the sulfonic acid group is 2-acrylamido-2-methyl propane sulfonic acid or p-styrene sulfonic acid.

4. An antistatic form forming a coating layer made of a composition according to claim 1, on the surface of a form.

5. An antistatic form according to claim 4, wherein the form is a film, a sheet or a container.

6. An antistatic form forming a coating layer made of a composition according to claim 1, on the surface of a form, wherein an inorganic electrically conductive layer composed of tin oxide powder containing antimony with mean particle size of 0.01 to 0.4 µm, or barium sulfate powder coated with tin oxide containing antimony with mean particle size of 0.01 to 2 µm, and a synthetic resin is provided between the surface of the form and the coating layer made of the composition.

* * * * *